(12) United States Patent
Haas et al.

(10) Patent No.: US 11,774,228 B2
(45) Date of Patent: Oct. 3, 2023

(54) METHOD AND APPARATUS FOR TESTING WORKPIECES

(71) Applicant: Carl Zeiss Industrielle Messtechnik GmbH, Oberkochen (DE)

(72) Inventors: Günter Haas, Aalen (DE); Florian Dotschkal, Abtsgmünd (DE); Tobias Schramm, Eschach (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 171 days.

(21) Appl. No.: 17/119,854

(22) Filed: Dec. 11, 2020

(65) Prior Publication Data

US 2021/0180933 A1  Jun. 17, 2021

(30) Foreign Application Priority Data

Dec. 11, 2019 (EP) ..................................... 19215250

(51) Int. Cl.
*G01B 5/016* (2006.01)
*G01B 11/00* (2006.01)

(52) U.S. Cl.
CPC ............ *G01B 5/016* (2013.01); *G01B 11/005* (2013.01)

(58) Field of Classification Search
CPC ...... G01B 5/016; G01B 11/005; G01B 21/04; Y02P 90/02; G05B 2219/32201; G05B 19/41875
See application file for complete search history.

(56) References Cited

U.S. PATENT DOCUMENTS

| 2006/0047457 A1* | 3/2006 | Agapiou ................ G01B 21/04 702/94 |
| 2017/0160066 A1* | 6/2017 | Grupp ..................... G01B 21/04 |
| 2018/0267521 A1 | 9/2018 | Ferry et al. |

OTHER PUBLICATIONS

IEEE Spectrum, "Chip Hall of Fame: Microchip Technology PIC 16384 Microcontroller", Jun. 30, 2017; spectrum.ieee.org/chip-hall-of-fame-microchip-technology-pic-16c84-microcontroller (Year: 2017).*
Giovino, Bill, "Zilog buys microcontroller product lines from Samsung", Jun. 7, 2013; microcontroller.com/news/Zilog_Buys_Samsung_Microcontrollers.asp (Year: 2013).*

* cited by examiner

*Primary Examiner* — Catherine T. Rastovski
*Assistant Examiner* — Yossef Korang-Beheshti
(74) *Attorney, Agent, or Firm* — Miller Johnson

(57) ABSTRACT

A method is described for measuring workpieces, each having structural features that form test features for measurement. The method determines an unstable one and a stable one of the test features, based on expected violation or satisfaction, respectively, of a statistical control rule. The method measures workpieces such that the unstable test feature is measured more frequently than the stable test feature. The method ascertains whether the unstable test feature remains unstable and whether the stable test feature remains stable. The method measures additional workpieces if the unstable test feature remained unstable and the stable test feature remaining stable. The determining is repeated if the unstable test feature is no longer unstable, the stable test feature is no longer stable, or any other measurement feature changes, such as if a new batch of workpieces is to be measured, environmental conditions change, or measurement has proceeded longer than a predefined threshold.

26 Claims, 2 Drawing Sheets

METHOD AND APPARATUS FOR TESTING WORKPIECES

CROSS-REFERENCE TO RELATED APPLICATIONS

This application claims priority to European Patent Application No. 19 215 250.2 filed Dec. 11, 2019. The entire disclosure of the application referenced above is incorporated by reference.

FIELD

The present disclosure relates to industrial metrology and more particularly to methods and systems for control of a coordinate measuring machine.

BACKGROUND

In the industrial manufacturing of workpieces, the continuous monitoring of the quality of the workpieces is important so that any errors in the production sequence can be discovered promptly. However, the monitoring of the quality of the workpieces takes some time and thus reduces the yield from the production sequence. It is therefore necessary to balance a necessary control of the quality with the required yield from the production sequence.

SUMMARY

One form of quality control consists in the manual definition of test criteria, for example based on a user's empirical values. Test criteria that can be defined are, for example, measurement points on a workpiece. The measurement points are then measured and compared to a target value. As long as all measurement points do not exceed a deviation from their tolerance, the workpiece can pass the quality control. In this method, the interaction of a user is disadvantageous because not only does the definition of the test criteria require a great degree of user knowledge, but the intervention by the user introduces a susceptibility to errors.

Furthermore, a change in the test criteria undertaken by the user, for example reducing the test scope to accelerate the test, is likewise dependent on the user's knowledge or cannot be performed by the user at all. By this, the time it takes to test a multiplicity of workpieces cannot be decreased.

Furthermore, by the intervention of a user, no full automation of the production sequence including workpiece testing can take place. It is therefore not possible to automatically adjust the test scope with respect to peculiarities of the production sequence.

It is an object of the present invention to provide a method and an apparatus for simplified or more efficient quality control that does not entail in particular at least one of the abovementioned disadvantages.

The invention proposes:
a method for measuring a plurality of workpieces, wherein each of the workpieces has a plurality of structural features that are equally present in the other workpieces and are test features that are to be measured, wherein the method comprises:
a) ascertaining or assuming at least one unstable test feature, wherein a violation of at least one, preferably predefined, statistical control rule is present or assumed for the unstable test feature (that is, violation of the statistical control rule is expected for the unstable test feature),
b) ascertaining or assuming at least one stable test feature, wherein no violation of at least one, preferably predefined, statistical control rule is present or assumed for the stable test feature (that is, satisfaction of the statistical control rule is expected for the unstable test feature),
c) measuring a plurality of workpieces, wherein the at least one unstable test feature is measured more frequently than the at least one stable test feature,
d) ascertaining whether a violation of at least one, preferably predefined, statistical control rule continues to be present for the at least one unstable test feature and whether the at least one unstable test feature continues to be unstable, and ascertaining whether a violation of at least one, preferably predefined, statistical control rule continues to not be present for the at least one stable test feature and whether the at least one stable test feature continues to be stable,
and furthermore including
e) measuring further workpieces as in c), if, based on the ascertainment in d), the at least one unstable test feature continues to be unstable and the at least one stable test feature continues to be stable,
or, as an alternative to e),
f) repeating a) and b) if one or more of the following cases occur:
i. if, based on the ascertainment in d), the at least one unstable test feature is no longer unstable and/or the at least one stable test feature is no longer stable,
ii. if a change in a production process of the workpieces, a change in a measurement method, or a change in environmental conditions has occurred,
iii. if c) has been performed for a predetermined time period,
iv. if c) has been performed on a predetermined number of workpieces,
v. if a new batch of workpieces is measured or is to be measured,
in order to newly determine at least one unstable test feature and at least one stable test feature,
and subsequently repeating c),
wherein, subsequently, a sequence of d) and then e) or f) can be repeated once or multiple times. The sequence means [d) plus {e) or f)}].

Here and in the text below, the points or measures a)-f) of the method are also referred to as "steps." In the method, the measures a)-f) of the method can also be referred to as steps. The designation using letters in alphabetical order or as "steps" does not mean that such steps must necessarily be performed in succession and in this order. Other orders may be performed or measures can be performed at the same time, provided this does not impede the attainment of the method objective. For example, a) and b) can take place at the same time or in any desired order. For example, c) and d) can take place at the same time. The situation is different if an order is explicitly defined. This is not an exhaustive list of possibilities. The term "step" may be dispensed with without deviating from the meaning of the invention.

The statistical control rule in a) and b) can be the same, although this is preferable but not mandatory. In other words, different statistical control rules may be used.

When ascertaining in d) whether a violation of at least one statistical control rule continues to be present for the at least one unstable test feature, the statistical control rule in d) is preferably the same statistical control rule as in a).

When ascertaining in d) whether a violation of at least one statistical control rule continues to not be present for the at least one stable test feature, the statistical control rule in d) is preferably the same statistical control rule as in b).

The method can be performed continuously during the measurement. Steps c) and then steps d) and thereafter (after d)) e) or f) can be repeated as often as desired.

The invention utilizes the findings from the statistical process violation in particular to adapt a, preferably dynamic, test accuracy and to newly generate the test scope on the measurement device, which preferably also takes place dynamically.

A structural feature of the workpiece can in particular be a feature that is produced by a manufacturing step of a manufacturing method, e.g. casting, forging, milling or drilling. For example, a structural feature may be a drilled hole, an edge, an elevation, a cutout, a surface roughness, or any desired combination thereof.

A structural feature of the workpiece preferably has one or more previously defined shapes. A structural feature of the workpiece preferably has one or more previously defined dimensions.

The structural features are equally present in all workpieces. That means, for example, that each workpiece has at least undergone the same manufacturing step by which the structural feature was produced and/or each workpiece consists of the same semi-finished product. Accordingly, "equally" does not mean identical. In the ideal case, the structural features should have identical dimensions, but in practice do not, which is why a measurement for the purposes of quality control is necessary. In particular, the structural features can differ from one another by tolerances of the manufacturing method/semi-finished product.

The workpieces can be workpieces that correspond to one another in respect of their geometry and in particular their target geometry.

The method can be a method for coordinate measurement.

The structural features are in particular test features that are to be measured or have been measured by way of coordinate measurement. In particular, an optical and/or tactile coordinate measuring machine or a computed-tomography measurement system can be used for the measurement.

Every structural feature may be a test feature. In particular, it is also possible for only a part of the structural features of the workpieces to be a test feature. According to the invention, it is possible for only a part of the structural features to be measured.

Each test feature can be assigned at least one measurement point. Each measurement point can have at least one coordinate value, preferably three coordinate values. A measurement point can be specified in particular by the characteristic shape of the test feature. For example, a measurement point can be at the periphery/bottom of a hole or can be the end point of an elevated region or projection.

In particular, a plurality of measurement points can be assigned to a test feature such that the test feature is thereby measured approximately symmetrically. One example of this is the arrangement of a plurality of measurement points at a periphery of a hole equidistantly along the periphery.

When assuming the at least one unstable test feature, a number of test features for which an instability is likely can be assumed based on empirical values of a user.

Alternatively, it can also be assumed that for example all test features are unstable, with the result that a complete measurement of all test features can take place in a further step. This is advantageous, for example, when a step in the production process has changed and all test features should be measured for a specific number of workpieces for the purpose of better control.

In order to ascertain whether a test feature is stable or unstable, a multiplicity of workpieces of the same type are measured, the test features are evaluated based on the statistical control rule. The criterion stable or unstable refers in particular to the measurement series performed on a plurality of workpieces. The same test feature can here be measured or have been measured on different workpieces.

A statistical control rule can be a rule for monitoring or a statistical control method.

A statistical control rule can be one of the following, or any desired combination of one or more of the following:
  a dispersion of measurement values. The dispersion of the process can be monitored here.
  one or more control charts. These are suitable for monitoring the process.
  one or more Nelson rules. These are suitable for detecting a process violation.
  one or more Western Electric rules. These are suitable for detecting a process violation.

Regarding the dispersion of measurement values:

The violation of the statistical control rule may consist in that, in the case of the dispersion of measurement values, values ascertained on the test feature in workpieces of the same type have a dispersion that exceeds a specified extent, a specified tolerance, or a specified limit.

In the case of a stable test feature, measurement values of the test feature cannot disperse or disperse only within a prescribed tolerance or limit. In that case, the stable test feature has stable measurement values. One portion of measurement values, in particular a portion of at most 10% or at most 5% of the measurement values, may also lie outside a tolerance or limit. The limit can be, for example, a standard deviation or a multiple or a fraction thereof, in particular a limit of three times the standard deviation (3S limit).

For an unstable test feature, measurement values of the test feature may disperse more strongly than for the stable test feature or disperse outside a prescribed tolerance or limit. In that case, the unstable test feature has unstable measurement values.

A test feature is stable, for example, if in the case of a plurality of workpieces an assigned value of a test feature, for example a length, a diameter, or the like, lies within the 3S limits (three standard deviations). Conversely, this is not the case for an unstable test feature.

Regarding Nelson rules, Western Electric rules:
  One possible statistical control rule is one or more Nelson rules or one or more Western Electric rules.

Regarding the control chart:
  A statistical control rule can be illustrated on a control chart or be monitored therewith.

To ascertain the stability, a statistical evaluation may be used.

A target value can in particular be defined by a CAD model or by a drawing default, or by generated test lists from test planning systems or from experience or from an evaluation of another workpiece, in particular of a reference workpiece.

By ascertaining/assuming all the unstable test features for a workpiece, the remaining test features can be assumed to be stable. By ascertaining/assuming all the stable test features for a workpiece, the remaining test features can be assumed to be unstable. Step b) can result from the performance of step a), or vice versa.

In particular, an unstable test feature is a region of a workpiece in which the likelihood of deviations that result in the workpiece lying outside the desired manufacturing parameters is greater than for a region of a stable test feature.

The measurement can preferably be performed using an optical and/or tactile coordinate measuring machine. Other test methods are also possible, for example computed tomography.

When measuring a plurality of workpieces, the at least one unstable test feature is measured more frequently than the at least one stable test feature.

In one embodiment, the workpieces are measured in a series, wherein only the unstable test feature is measured for a first number or workpieces of the series, and the unstable test feature and the stable test feature are measured for a second number of workpieces of the series. In this way, the unstable test features are measured more frequently than the stable test features, specifically for the first number in the series and for the second number in the series, whereas the stable test features are measured only for the second number. Preferably, the unstable test features are measured on all workpieces. The stable test features are preferably measured only for every z-th (z=integer), for example every second or third or fourth or fifth, workpiece. In all the other workpieces, preferably only the unstable test features are measured. With particular preference, the stable test features are measured only ever after the unstable test features of y workpieces (y=integer), for example two or three or four or five workpieces, have been measured. In this way, it is possible to advantageously reduce the number of the test features to be measured for a plurality of workpieces, which is a particularly great advantage of the invention according to this preferred embodiment.

A series can consist of:
A) y (first number) workpieces, in which only the at least one unstable test feature is measured,
B) x (second number) workpieces, in which the at least one unstable test feature and the at least one stable test feature are measured,
wherein x and y are integers ≥1 and wherein the order of A) and B) is arbitrary.

The series can be repeated as often as desired. In other words, first a part of the first number of workpieces, for example five workpieces, can be measured, then a part of the second number of workpieces, for example one workpiece, and then again five workpieces of the first number and again one workpiece of the second number, and so on.

On the other hand, after a series has been carried out one or more times, the series can be changed as desired, for example by changing x and/or y or changing the order A) and B).

In one embodiment, the first number is greater than the second number. In this way, the at least one unstable test feature can be measured on more than twice as many workpieces as the at least one stable test feature.

As long as the result of d) is that the at least one unstable/stable test feature ascertained or assumed in step a) and b) continues to be unstable/stable, further workpieces are measured in step e) with the already ascertained unstable/stable test features. The measurement is performed analogously to step c).

Alternatively, further workpieces can also be measured analogously to step c) as long as at least the at least one stable test feature has remained stable and the at least one unstable test feature has become stable or has been found to be stable.

Alternatively, steps a) and b) are repeated provided one or more of the criteria, in any desired combination, mentioned above under i.-v. has/have been met. These will be explained below:

A change in the production process of the workpiece can consist in particular in a change in a manufacturing step of the production process. By way of example, a manufacturing step can be changed/added/eliminated, or a tool for manufacturing the workpieces can be exchanged/replaced.

A change in a measurement method can be a change in the coordinate measurement, and can in particular consist in changing the test means. For example, a tactile or optical sensor can be exchanged.

A change in the environmental conditions is, without limitation, for example a change in room temperature, air humidity, and/or air pressure.

A change in the environmental conditions, for example in the room temperature, can lead both to influencing of the production process and to a change in the manufacturing quality and/or to a change in the results of the coordinate measurement. Accordingly, steps a) and b) can also be repeated in dependence on the change in environmental conditions.

In yet a further variant, the repetition of steps a) and b) can take place after a specific time. For example, the unstable/stable test features can be ascertained again after each shift change of after every interruption of manufacturing or after a predefined time of, for example, 24 hours.

In yet a further variant, the repetition of steps a) and b) can take place after a specific number of workpieces have been measured using step c). For example, an ascertainment according to step a) and b) can be performed after every 10th or 50th or 100th component.

In particular, the repetition of steps a) and b) can take place after a batch change of the workpieces. A batch is in particular a production batch.

Steps a) and b) can be repeated preferably such that for a number of workpieces that are to be subsequently measured, all test features are measured with the same frequency in order to ascertain at least one unstable test feature and at least one stable test feature. In particular, all test features of each measured workpiece are measured and the stable and unstable test features are ascertained again from the resulting measurement data.

An advantage of the invention is that external influences on the production process can be controlled.

In one embodiment, steps a) and b) comprise ascertaining the at least one stable test feature and ascertaining the at least one unstable test feature by evaluating a data set containing data from an earlier measurement of at least one workpiece having the test features. In particular, the generation of the data set can be an additional method step done before step a). In particular, the data set can be generated by measuring by means of the same coordinate measuring machine that is used in step c). The data set can be generated in particular by measuring workpieces that have the same structural features as the workpieces that are to be measured.

The data set can comprise in particular measurement values and measurement points, wherein each measurement point can be assigned a coordinate value (measurement value) by way of a measurement. The measurement points can in particular correspond to measurement points of test features of a workpiece.

The data set can comprise in particular the measurement values and measurement points of a multiplicity of workpieces, wherein each workpiece is uniquely assigned its measurement points of the test features and the associated measurement values.

The data set can be stored for example in a database for a plurality of workpieces of different geometries. The data set for the ascertainment in steps a) and b) can then be obtained from the database.

Alternatively, the measurement values of the data set for the ascertainment in steps a) and b) on at least one workpiece can have been ascertained, as already mentioned above, before the performance of steps a) and b) by the measurement system that is also used in step c). The measurement values of the data set can preferably be ascertained on a multiplicity of workpieces.

A plurality of workpieces can preferably be measured before steps a) and b) are performed. The greater the number of the measured workpieces is, the more accurate can the ascertainment of the unstable/stable test features work.

Ascertaining the unstable/stable test features in steps a) and b) and the violation or non-violation of the statistical control rule can be understood to mean that a deviation of a statistical variable that has been ascertained from the multiplicity of the workpieces of a data set exceeds or does not exceed a specified tolerance or limit.

By way of example, an average value for the measurement point can be formed from the measurement value of a measurement point for all the workpieces of the data set. It is then possible to establish for the average value whether it exceeds a tolerance or limit. For example, it can be compared to a target average value.

In one embodiment, each test feature, stable or unstable, is assigned a plurality of measurement points, and in step c), a plurality of assigned measurement points are measured for the unstable test feature and fewer assigned measurement points are measured for the stable test feature than for the unstable test feature. By reducing the measurement points for the stable test feature, it is possible to additionally reduce a measurement time. By way of example, it is possible for a test feature that is a drilled hole and has four equidistant measurement points along the periphery of the drilled hole to measure all four measurement points if the test feature is unstable, and to measure only one measurement point if the test feature is stable. Conversely, the number of measurement points for the unstable test feature can be increased to obtain a better measurement result. Reducing measurement points for the at least one stable feature and increasing measurement points for the at least one unstable feature can balance each other out, with the result that weighted quality control is obtained without increasing the measurement time therefor or with even reducing it.

In a further embodiment, at least one test plan is used. The test plan can be created according to the invention and be changed as necessary. The at least one test plan can preferably be created following steps a) and b).

The test plan encompasses at least the at least one unstable test feature. For example the more frequent measurement of the unstable test feature can mean in the extreme case that only the at least one unstable test feature and no stable test feature is measured.

The test plan may preferably encompass only the at least one unstable test feature and in that case is referred to as a reduced test plan. By using the reduced test plan in step c), at least the at least one unstable test feature, or only the unstable test feature, can then be measured on a workpiece. By way of example, all the workpieces to be measured in step c) can be measured with the reduced test plan, as a result of which the at least one unstable test feature is measured for each workpiece. By contrast, the at least one stable test feature may for example not be included in the reduced test plan, as a result of which it cannot be measured for any workpiece and therefore the at least one unstable test feature is measured more frequently than the at least one stable test feature, which, in the extreme case, is not measured at all.

Furthermore, a further, specifically complete, test plan can be used. The complete test plan contains the at least one unstable test feature and the at least one stable test feature.

The complete test plan can be the test plan that was used to generate the data set or was used in steps a) and b). The complete test plan can serve for controlling the grouping of all test features into unstable/stable. In particular, at least one workpiece can be measured in step c) with the complete test plan, and it can be ascertained in step d) to what extent the at least one stable test feature is still stable.

One advantage when using the reduced test plan can be the decrease in measurement time for the reduced test plan as compared to the complete test plan, on account of the reduced test features, which can be considered to be a particular advantage of the invention.

By selecting a corresponding test plan, it is then possible to determine for a workpiece whether for example only the unstable test features or all test features are measured. By combining different test plans, for example the complete test plan and the reduced test plan, the complexity in terms of measurement technology can be advantageously reduced.

In one embodiment, the first number of workpieces of the series are measured according to the reduced test plan encompassing only the at least one unstable test feature, and the second number of workpieces of the series are measured according to the complete test plan encompassing the at least one unstable test feature and the at least one stable test feature.

In particular, due to the combination of different test plans, the sequence described in step c), specifically the measurement of a plurality of workpieces, wherein the at least one unstable test feature is measured more frequently than the at least one stable test feature, can be advantageously achieved.

The complete and the reduced test plan can be used, in any order, as the basis for the sequence. Due to the combination of the reduced test plan with the complete test plan, the at least one unstable test feature is thus measured more frequently, preferably on each workpiece, than the at least one stable test feature.

An above-defined series for measuring workpieces can consist of:
A) y (first number) workpieces, in which only the at least one unstable test feature is measured according to the reduced test plan,
B) x (second number) workpieces, in which the at least one unstable test feature and the at least one stable test feature are measured according to the complete test plan,
wherein x and y are integers $\geq 1$ and wherein the order of A) and B) is arbitrary.

By switching between the test plans it is also possible to advantageously achieve the sequential measurement described above of the at least one unstable test feature and of the at least one unstable test feature in combination with the at least one stable test feature.

In addition to information relating to the test features to be measured, a test plan can also comprise other measurement information, for example information relating to the movement paths between the individual test features or measurement points of the test features. This test plan can then be used to measure a plurality of workpieces.

In particular, the reduced test plan can be created after the steps a) and b) and before step c). The reduced test plan can then be used to measure a plurality of workpieces in step c).

In one embodiment, the reduced test plan contains movement commands for a measurement sensor that are such that, during the measurement with the measurement sensor, a decrease in the measurement time takes place due to a reduced movement path. The reduced test plan, for example as compared to the complete test plan, can in particular be designed such that, owing to the movement commands, a faster measurement of a workpiece becomes possible. For example, the test plan can specify optimized displacement movements between individual measurement points, with the result that a measurement time can be as short as possible. By optimizing the movement commands, it is possible to attain an additional time saving for the reduction by saving on test features to be measured. In particular, the measurement of workpieces can thus be optimized in terms of time by the minimization of the test features and the optimization of the movement commands, as compared to the measurement of all test features on a workpiece.

Alternatively, the test plan can consist of two partial test plans. By way of example, a first partial test plan can encompass the at least one unstable test feature, in particular all unstable test features, and a second partial test plan can encompass all test features (both stable and unstable). In other words, the first partial test plan can be identical to the reduced test plan, and the second partial test plan can be identical to the complete test plan. Such a test plan consisting of two partial test plans is also referred to as a total test plan. The total test plan can furthermore establish a sequence of the partial test plans, with the result that for example always five workpieces in succession are measured with the first partial test plan, then one workpiece is measured with the second partial test plan, then five workpieces are measured again with the first partial test plan, and so on. As a result, switching between different test plans is dispensed with, and the same effect as in the previously described alternating use of the reduced test plan and the complete test plan can be achieved. Owing to the test plan, it is then advantageously possible again to measure the unstable test features more frequently, that is to say on more workpieces, than the stable test features.

In particular, after step f) has been performed and steps a) and b) have been performed again, a test plan established/changed before step f) is performed can serve as a basis for establishing a further changed test plan.

A movement command can be an instruction to the measurement device with which step c) is performed, wherein the instruction defines in particular a movement sequence of the measurement device from one measurement point to a further measurement point. Movement commands can thus control in particular the movements of the measurement device for measuring a workpiece.

Furthermore, an apparatus is proposed, in particular a coordinate measuring machine, that is set up to perform the method according to the invention. The apparatus can have an optical, tactile or tomographic measurement system.

In one embodiment, the coordinate measuring machine comprises evaluation software designed to perform steps a) and b) of the method according to the invention and to generate instructions for measuring workpieces, by way of which the at least one unstable test feature is measured in step c) more frequently than the at least one stable test feature, controlling software that is designed to receive the instructions and to control step c) of the method based on the instructions and is designed to transfer measurement values obtained from step c) to the evaluation software.

The evaluation software is designed in particular such that it can perform steps a) and b) both on the basis of a data set or an assumption and/or the measurement values obtained from step c).

The controlling software is in particular set up to process a test plan mentioned. The processing can be of a type such that the measurement of a workpiece is controlled by the controlling software on the basis of the test plan. The controlling software can furthermore be set up to process different test plans in a specified order or sequence.

The test plan can be, for example, a reduced test plan, in other words encompass only the at least one unstable test feature. The controlling software can then perform step c) on the basis of the reduced test plan, wherein the at least one unstable test feature is measured more frequently than the at least one stable test feature.

In a further embodiment, the instructions contain a reduced test plan that contains only the at least one unstable test feature, and a complete test plan that contains both the at least one unstable test feature and also the at least one stable test feature, wherein the evaluation software is set up to transfer either the reduced test plan or the complete test plan to the controlling software such that, when the workpieces are measured in step c) of the method, a first number of workpieces are measured according to the reduced test plan and a second number of workpieces are measured according to the complete test plan.

In particular, the at least one unstable test feature is measured more frequently than the at least one stable test feature due to the measurement of the at least one unstable test feature on more workpieces than the at least one stable test feature.

The measurement sequence can be achieved for example by partial test plans and a sequence of the partial test plans. As described above, a total test plan can comprise a first partial test plan, encompassing only the unstable test features, and a second partial test plan, encompassing all test features. Within the test plan, a sequence of the partial test plans can then be defined, for example sequential measurement of a number y of workpieces with the first partial test plan and measurement of a number x of workpieces with the second partial test plan. In this way, the unstable test features are advantageously measured more frequently than the stable test features, wherein control of the stable test features can still take place.

In a further embodiment, the reduced test plan contains movement commands for a measurement sensor that are such that, while the measurement is controlled with the controlling software, a decrease in the measurement time takes place due to a reduced movement path of the measurement sensor.

In a further embodiment, a measurement system for performing the method comprises a controller and a measurement computer, wherein the evaluation software can be stored on the controller or the measurement computer and the controlling software can be stored on the controller or the measurement computer.

In a further embodiment, the evaluation software is further designed to perform step d) of the method according to the invention.

In a further embodiment, the controlling software is designed such that it can receive and process an external signal. An external signal is generated for example if one or more of the cases i.-v. mentioned above and in claim 1 is/are present. For example, the controlling software can receive information relating to changes to the manufacturing process and/or the measurement of the workpieces, by way of an external signal. The controlling software could then for example, in order to improve the control of the at least one stable test feature, interrupt the controlling of the coordinate measuring machine on the basis of the test plan/test plans used up to this point and instead control, preferably for a predetermined number of workpieces, the measurement of a plurality of workpieces only with the complete test plan. In this way, it is possible to advantageously check changes of the test features due to external influences.

With respect to the embodiments of the apparatus, reference is made to the full content of the embodiments for the method.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Example embodiments of the invention will now be described with reference to the accompanying drawing. In the individual figures of the drawings.

DETAILED DESCRIPTION

Figure 1:
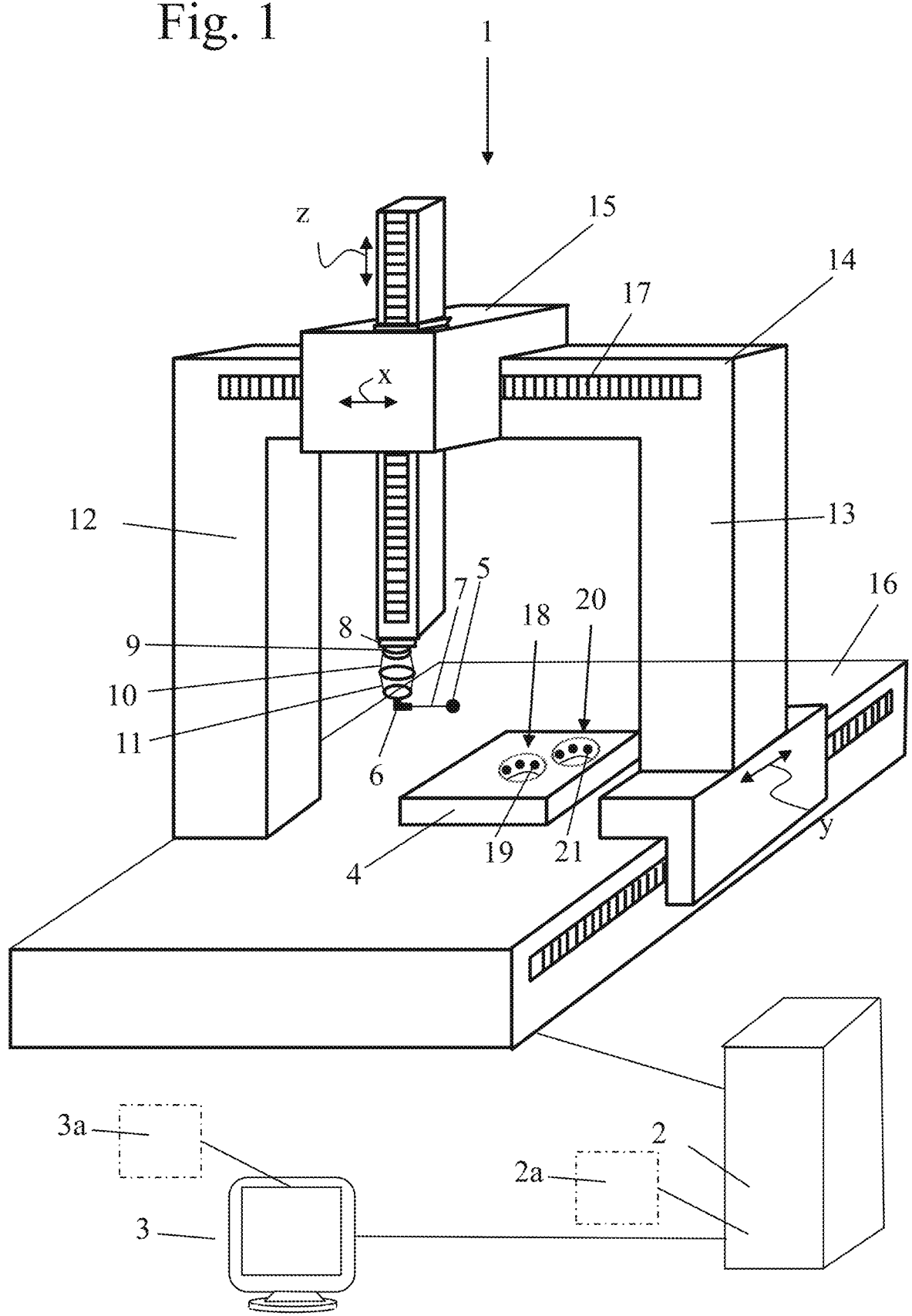
FIG. 1 shows a schematic illustration of a coordinate measuring machine according to the invention.

The coordinate measuring machine (CMM) 1 with a portal design, depicted in FIG. 1, has a measurement table 16, above which columns 12, 13 are arranged such that they are movable in the Y-direction of a Cartesian coordinate system (x, y, z). Together with a crossbeam 14, the columns 12, 13 form a portal of the CMM 1.

At its opposite ends, the crossbeam 14 is connected to the columns 12 and 13, respectively. Electric motors, which are not depicted in more detail, cause the linear movement of the columns 12, 13 in the y-direction, along the y movement axis. Here, for example, one electric motor is assigned to each of the two columns 12, 13. The crossbeam 14 is combined with a cross slide 15, which is movable, by way of air bearings, along the crossbeam 14 in the x-direction of the Cartesian coordinate system. The current position of the cross slide 15 relative to the crossbeam 14 can be determined on the basis of a scale graduation 17. The movement of the crossbeam 15 in the x-direction, i.e. along the x movement axis, is driven by a further electric motor.

A quill 8, which is movable in the vertical direction, is mounted on the cross slide 15 and connected at the lower end thereof to a measuring head 11 by way of a mounting apparatus 9 and a rotary joint 10. The measuring head 11 is connected to an angled part 6 on which a stylus 7 with a probe ball 5 is arranged in a removable manner. The quill 8 can be moved, driven by a further electric motor relative to the cross slide 15 in the z-direction, along the z movement axis of the Cartesian coordinate system.

The measuring head 11 can be brought into virtually any position in the region below the crossbeam 14 by way of the electric motors of the CMM. Furthermore, the rotary joint 10 can rotate the measuring head 11 about the z-axis such that the stylus 7 can be aligned in different directions. The combined construction of measuring head 11, angled part 6, stylus 7, and probe ball 5 forms a tactile sensor.

The controller 2 is set up for performing one or more of the steps explained in the general part of the description.

The coordinate measuring machine is connected to the schematically illustrated controller 2 and a schematically illustrated measurement computer 3, on which the evaluation software 3a can run.

FIG. 1 furthermore shows a workpiece 4, which can be probed with the probe ball 5 or measured with the tactile sensor 11, 6, 7, 5. An unstable test feature 18, more specifically a drilled hole 18 and three measurement points 19 assigned to the drilled hole 18 (for reasons of clarity, only one measurement point is denoted by a reference sign), and a stable test feature 20, more specifically a drilled hole 20 and three measurement points 21 assigned to the drilled hole 20 (for reasons of clarity, only one measurement point is denoted by a reference sign), are located on the workpiece 4. Drilled holes are used here as the test features only as examples and for simplification purposes. In practice, it cannot necessarily be assumed in the case of two substantially identical drilled holes that one of these is a stable test feature and another is an unstable test feature. Any surface structure of the workpiece that can be found analogously in other workpieces can be a test feature.

Further workpieces to be measured that have the same shape as the workpiece 4 will be denoted with 4a, 4b . . . and are not illustrated here.

The unstable test feature 18 is unstable for example because, after measurement on a plurality of workpieces of the same type, the dispersion of the diameter of the hole obtained is such that not all diameter values lie within the 3S limits, which, however, is the case for the stable test feature 20.

The evaluation software 3a is designed such that it can perform steps a) and b) as claimed in claim 1 (step S1 and step S2 in FIG. 2) of the method according to the invention. The evaluation software 3a then outputs an information to the controller 2, which contains at least an information relating to the unstable test feature 20, preferably also to the unstable test feature 18.

The controller 2 controls the measurement of the workpiece 4 or of other workpieces, as is required for step c) (step S3 in FIG. 2), receives the measurement data, for example the measurement value for the measurement point 21 of the unstable test feature 20, from the coordinate measuring machine 1, and can optionally store it. For example, the controller can store the measurement data in a data set that can serve for performing steps a) and b) according to the invention. Alternatively, the measurement data can be passed from the controller 2 directly to the measurement computer 3. The measurement computer 3 can store the measurement data, for example in a data set. The measurement computer 3 can also evaluate the data according to step d) (step S4 in FIG. 2). In particular, the controller 2 can use the controlling software 2a for controlling the measurement.

If the evaluation in measurement computer 3 in step d) (step 4) indicates that the categorization of all test features into unstable/stable is unchanged, the measurement computer 3 outputs an information to the controlling software (2*a*) so that the latter continues with step e.

If the evaluation in the measurement computer 3 in step d) indicates that the categorization of at least one test feature into unstable/stable has changed, the measurement computer 3 performs, together with the measurement software 3*a*, steps a) and b) (S1, S2) again.

The measurement computer 3/the measurement software 3*a* can also establish a test plan, which is then transmitted to the controller 2. The displacement movements of the coordinate measuring machine 1 specified by the controller 2 can then be specified by the test plan established by the measurement computer 3 or be ascertained therefrom.

The embodiment described with reference to FIG. 1 is only an example. In practice, a computer server can be used instead of a measurement computer. Alternatively or in addition, a handheld computer such as a smartphone can also be used. The controller 2 can also be integrated in the measurement computer 3, or vice versa.

Figure 2:
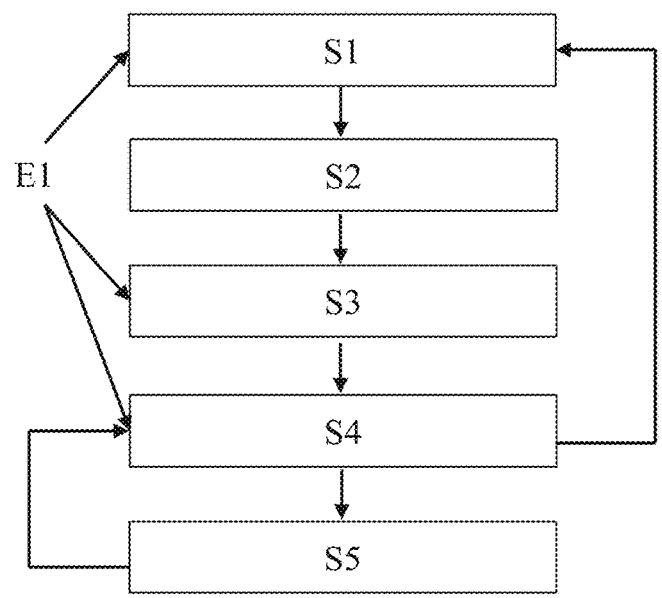
FIG. 2 illustrates a flowchart of a method according to the invention.

When performing the method according to the invention, the procedure may be, for example, as follows. Reference is made to FIG. 2.

FIG. 2 shows a block diagram for illustrating the method. In step S1, the unstable test features are ascertained or assumed.

If assumed, a user can make their assumption regarding the test features that are likely to be stable or unstable based on their experience.

In the case of an ascertainment, by contrast, the measurement of a plurality of workpieces or the data set of a measurement (measurement data set) of a plurality of workpieces can be used.

The measurement of the plurality of workpieces can in particular have been done before step S1 by means of the coordinate measuring machine used in the method or of another coordinate measuring machine. As many workpieces as are necessary for the correct ascertainment in step S1 can be measured in that case. For example, a statistical evaluation in step S1 may require a minimum number of measured workpieces.

Measurement data from the measurement with this coordinate measuring machine 1 are transferred via the controller 2 to the measurement computer 3. The measurement data set that can be stored in the measurement computer 3 and be used for a later ascertainment according to step S1 can furthermore be generated from the measurement data.

Alternatively, an already existing data set with measurement values, which is stored for example on the measurement computer, can be used for the ascertainment in step S1. This data set can originate from a measurement with another CMM or from an earlier measurement with this CMM that does not immediately precede the method according to the invention.

In particular, a data set encompasses only workpieces of the same target shape. In particular, a data set that encompasses only workpieces with the same target shape is used for the ascertainment in step S1 for a workpiece having the same target shape. Different data sets for different workpieces with different target shapes can thus be stored on the measurement computer. The measurement computer then uses the data set associated with the target shape of the workpiece for the ascertainment in step S1.

In the ascertainment in step S1 (step a)), a multiplicity of workpieces of the same type are measured and an unstable test feature is ascertained according to the above statistical rule (3S limits).

After the unstable test features have been ascertained, the stable test features are ascertained in step S2, likewise using the example rule (3S limits) as a basis. The same procedure as described under step S1 can be used here. Steps S1 and S2 can be performed at the same time.

Alternatively, it is also possible for ascertaining the stable test features in step S2 to exclude all the test features that were categorized as being unstable in step S1. All remaining test features, that is to say all the test features that were identified in step S1 as not being unstable, are then automatically categorized as being stable.

Steps S1 and S2 are preferably performed by the measurement computer.

After the test features have been classified as unstable and stable, a workpiece is measured in step S3.

For this measurement, an information relating to the unstable test feature 18 and, optionally, to the stable test feature 20 is transmitted, so that the unstable test feature 18 can be measured more frequently than the stable test feature 20 on the basis of this information.

The information can be transmitted for example in the form of a test plan. The test plan comprises in particular movement commands from one measurement point to another measurement point with which a workpiece can be measured in a manner that is optimized in terms of time. In particular, the information, or the controller processing the information, prompts the coordinate measuring machine to measure the unstable test feature 18 more frequently, that is to say on a greater number of workpieces 4, than the stable test feature 20.

In the measurement in step S3, one measurement value is generated for each measured measurement point 19, 21. The measurement values are stored for each workpiece in a data set, that is to say every measurement point 19, 21 with an associated measurement value.

In step S4, it is determined, from the data sets ascertained in step S3, using the measurement computer 3/the measurement software 3*a* which test features 18, 20 are unstable or stable. If in step S4 the same categorization into unstable and stable as in steps S1 and S2 is effected for all the test features, a step S5 can be performed.

In step S5, further workpieces are then measured analogously to S3.

If the categorization of at least one test feature in at least one workpiece in step S4 has changed compared to the categorization in step S1 and step S2, step S1 can be started again. This is the case i. in claim 1. Ascertaining one or more unstable test features again is indicated by the arrow going from step S4 to step S1.

If there is a change from an unstable test feature to a stable test feature, the procedure could be continued at step S5.

Alternatively, it is also possible to continue with step S5 if there is a change from a stable test feature to an unstable test feature, provided this only occurs in a number of workpieces, from the number of workpieces measured in step S3, that lies under a threshold value. For example 100 workpieces may have been measured in step S3, and in step S4 it was established, based on individual evaluation of each workpiece, that for only one workpiece a stable test feature has become unstable, and therefore it is nevertheless possible to continue with step S5. The threshold can be any arbitrary percentage number of workpieces. A statistical evaluation in which such individual "outliers" are not taken into account can be performed.

If the procedure continues after step S4 with steps S1 and S2, the data for the workpieces ascertained in step S3 can be used to ascertain the test features as unstable/stable.

After step S5, step S4 can be repeated using the data sets ascertained in step S5. This is indicated by the arrow from step S5 to step S4. This sequence, that is to say the performance of steps S4 and S5 in alternation, can be continued for as long as desired.

Furthermore, an external signal E1 can be used to intervene in the method sequence. The external signal E1 shows a result on the basis of which, according to one of cases ii.-v. in accordance with claim 1, the steps S1 and S2 must be repeated. It is indicated by this external event to ascertain again which test features are stable or unstable.

Such a repetition of steps S1 and S2 is preferably effected such that, for a number of workpieces that are to be subsequently measured, all the test features are measured, with equal frequency, according to a complete test plan and the stable and unstable test features are ascertained again from the resulting measurement data.

For example, an external signal E1 can contain an information relating to an exchange of a tool for a manufacturing step. For example, the accuracy in the manufacturing can change due to the exchange. Alternatively or in addition, a permissible manufacturing tolerance can be changed. In this way, a rule that is required in step S1 and step S2 for categorizing the test features as unstable and stable can be changed. For example, criteria may be tightened, there may be an instability if the values are already outside a 2S limit. It is possible with the external signal to signal a tool change, for example, to the measurement computer 3, whereupon the measurement computer changes a rule for the ascertainment of the test features.

In the same way, the external signal can contain an information relating for example to a change of the sensor of the coordinate measuring machine 1. The information could likewise be communicated to the measurement computer 3. With such a change of the measurement conditions, it is indicated to again perform steps S1 and S2.

However, the external signal E1 can for example also contain an information relating to a shift change and thus the instruction to measure all the test features. In this case, for example, the external signal E1 could provide an information in step S3 that a measurement in step S3 should no longer be performed with the information/test plan ascertained in step S1 and step S2, but rather that the workpieces in step S3 should be measured with the complete test plan so that a new measurement data set can be generated. Alternatively, it is likewise possible for the rule for a categorization as stable or unstable in step S1 to be changed by the external signal such that all the test features are categorized as unstable, as a result of which all the test features would likewise be measured in step S3.

Figure 3:
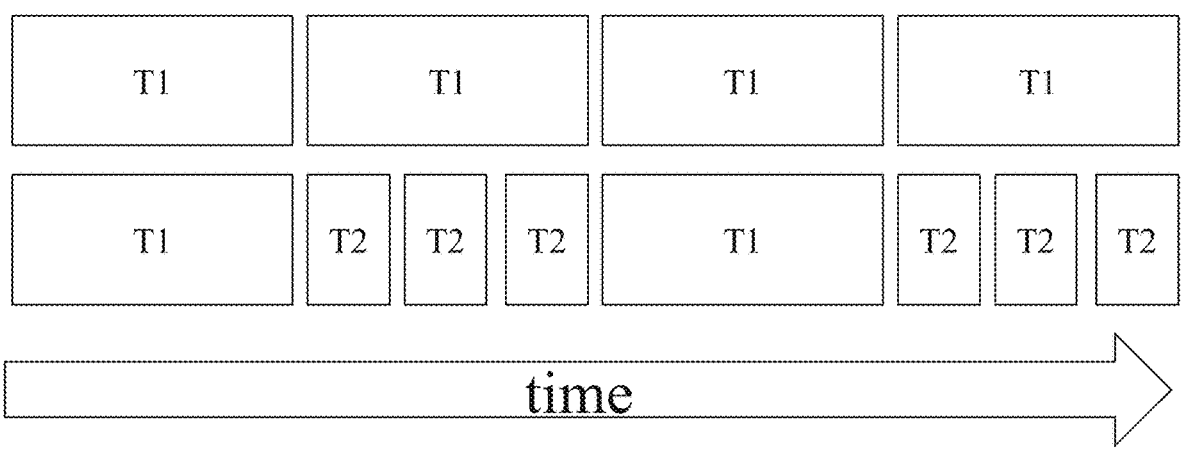
FIG. 3 shows different test plan sequences in a method according to the invention.

FIG. 3 shows a measurement series on workpieces, wherein a workpiece is assigned a test plan T1 or T2 in each case.

T1 means a complete test plan in which all stable and unstable test features are measured.

By contrast, the reduced test plan T2 encompasses a smaller number of test features, for example only the unstable test features. Accordingly, the measurement of a workpiece using the partial test plan T2 takes less time than using the test plan T1 or the partial test plan T2.

The first row of FIG. 3 shows that each workpiece is measured with the complete test plan T1.

By contrast, the second row in FIG. 3 shows the effect of switching between test plans T1 and T2 according to the invention. In the measurement series shown, only every fourth workpiece is measured with the complete test plan T1, and all other workpieces with the reduced test plan T2.

Due to the combination of the complete test plan T1 and the reduced test plan T2, eight workpieces can be measured in the same time it takes to measure only four workpieces if only the complete test plan T1 is used. This represents a significant time saving owing to the test plan established.

The time saving thus arises in particular by reducing the test features to be measured and the adapted movement commands. In particular, the unstable test features are measured both in the complete test plan T1 and in the reduced test plan T2, and the stable test features are additionally measured only for the complete test plan T1. Consequently, the unstable test features are measured more frequently, that is to say on more workpieces, than the stable test features.

In particular, the measurement computer 3/the measurement software 3a can pass the test plans T1 and T2 to the controller 2/controlling software 2a. In addition or optionally, an information relating a sequential measurement of a plurality of workpieces with the test plans T1 and T2 can also be passed to the controller. For example, a workpiece may be measured with the test plan T1 and then three workpieces with the test plan T2 and then again one test piece with the test plan T1 and so on.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc). The phrase at least one of A, B, and C should be construed to mean a logical (A OR B OR C), using a non-exclusive logical OR, and should not be construed to mean "at least one of A, at least one of B, and at least one of C."

The invention claimed is:

1. A method for measuring a plurality of workpieces, each having a plurality of structural features that form a plurality of test features to be measured, the method comprising:
 (a) from among the plurality of test features, determining an unstable test feature, wherein a violation of a statistical control rule is expected for the unstable test feature;
 (b) from among the plurality of test features, determining a stable test feature, wherein a violation of the statistical control rule is unexpected for the stable test feature;
 (c) measuring a set of the plurality of workpieces, including measuring the unstable test feature more frequently than the stable test feature, wherein:
  the set of the plurality of workpieces is measured in a series,
  for a first number of workpieces in the series, the unstable test feature is measured without measuring the stable test feature, and
  for a second number of workpieces in the series, the unstable test feature and the stable test feature are measured;
 (d) ascertaining whether:
  the unstable test feature remains unstable based on continued violation of the statistical control rule, and
  the stable test feature remains stable based on the statistical control rule remaining satisfied;

(e) in response to both the unstable test feature remaining unstable and the stable test feature remaining stable, measuring another set of the plurality of workpieces; and (f) repeating (a), (b), and (c) in response to at least one of:
the unstable test feature no longer being unstable,
the stable test feature no longer being stable,
a change in a production process of the workpieces,
a change in a measurement method,
a change in environmental conditions,
(c) having been performed for a predetermined time period,
(c) having been performed on a predetermined number of workpieces, and
a new batch of the plurality of workpieces is to be measured.

2. The method of claim 1 wherein the another set of the plurality of workpieces is non-overlapping with the set of the plurality of workpieces.

3. The method of claim 1 wherein the set of the plurality of workpieces measured in one iteration of (c) is non-overlapping with the set of the plurality of workpieces measured in each prior iteration of (c).

4. The method of claim 1 wherein each of the plurality of workpieces is measured at most once across all iterations of (c).

5. The method of claim 1 further comprising repeating (d), (e), and (f) at least once.

6. The method of claim 1 wherein the first number is greater than the second number.

7. The method of claim 1 wherein:
the first number of workpieces in the series are measured according to a reduced test plan;
the reduced test plan encompasses the unstable test feature and excludes the stable test feature;
the second number of workpieces in the series are measured according to a complete test plan; and
the complete test plan encompasses the unstable test feature and the stable test feature.

8. The method of claim 7, wherein:
the reduced test plan includes movement commands for a measurement sensor; and
the movement commands define a reduced movement path that results in a measurement time that is less than a measurement time of the complete test plan.

9. The method of claim 1 wherein the determining of (a) and the determining of (b) include evaluating a data set including data from an earlier measurement of at least one workpiece having the plurality of test features.

10. A method for measuring a plurality of workpieces, each having a plurality of structural features that form a plurality of test features to be measured, the method comprising:

(a) from among the plurality of test features, determining an unstable test feature, wherein a violation of a statistical control rule is expected for the unstable test feature;

(b) from among the plurality of test features, determining a stable test feature, wherein a violation of the statistical control rule is unexpected for the stable test feature;

(c) measuring a set of the plurality of workpieces, including measuring the unstable test feature more frequently than the stable test feature, wherein:
each test feature is assigned a plurality of measurement points;
for workpieces measured in (c), a first number of assigned measurement points are measured for the unstable test feature and a second number of assigned measurement points are measured for the stable test feature, and
the first number is greater than the second number;

(d) ascertaining whether:
the unstable test feature remains unstable based on continued violation of the statistical control rule, and
the stable test feature remains stable based on the statistical control rule remaining satisfied;

(e) in response to both the unstable test feature remaining unstable and the stable test feature remaining stable, measuring another set of the plurality of workpieces; and (f) repeating (a), (b), and (c) in response to at least one of:
the unstable test feature no longer being unstable,
the stable test feature no longer being stable,
a change in a production process of the workpieces,
a change in a measurement method,
a change in environmental conditions,
(c) having been performed for a predetermined time period,
(c) having been performed on a predetermined number of workpieces, and
a new batch of the plurality of workpieces is to be measured.

11. A coordinate measuring machine for measuring a plurality of workpieces, each having a plurality of structural features that form a plurality of test features to be measured, the coordinate measuring machine comprising:
a measurement sensor;
memory configured to store processor-executable instructions; and
at least one processor configured to execute the processor-executable instructions, wherein the processor-executable instructions include:

(a) from among the plurality of test features, determining an unstable test feature, wherein a violation of a statistical control rule is expected for the unstable test feature;

(b) from among the plurality of test features, determining a stable test feature, wherein a violation of the statistical control rule is unexpected for the stable test feature;

(c) measuring a set of the plurality of workpieces, including measuring the unstable test feature more frequently than the stable test feature;

(d) ascertaining whether:
the unstable test feature remains unstable based on continued violation of the statistical control rule, and
the stable test feature remains stable based on the statistical control rule remaining satisfied;

(e) in response to both the unstable test feature remaining unstable and the stable test feature remaining stable, measuring another set of the plurality of workpieces; and (f) repeating (a), (b), and (c) in response to at least one of:
the unstable test feature no longer being unstable,
the stable test feature no longer being stable,
a change in a production process of the workpieces,
a change in a measurement method,
a change in environmental conditions,
(c) having been performed for a predetermined time period,
(c) having been performed on a predetermined number of workpieces, and a new batch of the plurality of workpieces is to be measured, wherein the processor-executable instructions include evaluation software configured to:
perform (a) and (b), and
generate measurement instructions for measuring the plurality of workpieces such that the unstable test feature is measured in (c) more frequently than the stable test feature, and wherein the processor-executable instructions include controlling software configured to:
receive the measurement instructions,
control the measuring of (c) based on the measurement instructions, and
transfer measurement values obtained from (c) to the evaluation software.

12. The coordinate measuring machine of claim 11 further comprising:
a controller; and
a measurement computer,
wherein the memory is distributed between the controller and the measurement computer,
wherein the at least one processor includes a first processor and a second processor,
wherein the controller includes the first processor, and
wherein the measurement computer includes the second processor.

13. The coordinate measuring machine of claim 11 wherein:
the measurement instructions include:
a reduced test plan that includes the unstable test feature and excludes the stable test feature, and
a complete test plan that includes both the unstable test feature and the stable test feature; and
the evaluation software is configured to communicate the reduced test plan and the complete test plan to the controlling software such that, when the workpieces are measured in (c), a first number of workpieces are measured according to the reduced test plan and a second number of workpieces are measured according to the complete test plan.

14. The coordinate measuring machine of claim 13 wherein the reduced test plan includes movement commands for a measurement sensor that are such that, when the measurement is controlled with the controlling software, a decrease in the measurement time takes place due to a reduced movement path of the measurement sensor.

15. The coordinate measuring machine of claim 11 further comprising:
a controller; and
a measurement computer,
wherein the evaluation software is stored on at least one of the controller and the measurement computer, and
wherein the controlling software is stored on at least one of the controller and the measurement computer.

16. The coordinate measuring machine of claim 11 wherein the evaluation software is configured to perform the ascertaining of (d).

17. A non-transitory computer-readable medium comprising instructions including:
(a) from among a plurality of test features, determining an unstable test feature, wherein a violation of a statistical control rule is expected for the unstable test feature, wherein the plurality of test features correspond respectively to a plurality of structural features that are present in each of a plurality of workpieces;

(b) from among the plurality of test features, determining a stable test feature, wherein a violation of the statistical control rule is unexpected for the stable test feature;
(c) measuring a set of the plurality of workpieces, including measuring the unstable test feature more frequently than the stable test feature;
(d) ascertaining whether:
the unstable test feature remains unstable based on continued violation of the statistical control rule, and
the stable test feature remains stable based on the statistical control rule remaining satisfied;
(e) in response to both the unstable test feature remaining unstable and the stable test feature remaining stable, measuring another set of the plurality of workpieces; and
(f) repeating (a), (b), and (c) in response to at least one of:
the unstable test feature no longer being unstable,
the stable test feature no longer being stable,
a change in a production process of the workpieces,
a change in a measurement method,
a change in environmental conditions,
(c) having been performed for a predetermined time period,
(c) having been performed on a predetermined number of workpieces, and
a new batch of the plurality of workpieces is to be measured,
wherein the instructions include evaluation software configured to:
perform (a) and (b), and
generate measurement instructions for measuring the plurality of workpieces such that the unstable test feature is measured in (c) more frequently than the stable test feature, and
wherein the instructions include controlling software configured to:
receive the measurement instructions,
control the measuring of (c) based on the measurement instructions, and
transfer measurement values obtained from (c) to the evaluation software.

18. The method of claim 10 wherein the another set of the plurality of workpieces is non-overlapping with the set of the plurality of workpieces.

19. The method of claim 10 wherein the set of the plurality of workpieces measured in one iteration of (c) is non-overlapping with the set of the plurality of workpieces measured in each prior iteration of (c).

20. The method of claim 10 wherein each of the plurality of workpieces is measured at most once across all iterations of (c).

21. The method of claim 10 further comprising repeating (d), (e), and (f) at least once.

22. The method of claim 10 wherein:
in (c), the set of the plurality of workpieces is measured in a series,
for a first number of workpieces in the series, the unstable test feature is measured without measuring the stable test feature, and
for a second number of workpieces in the series, the unstable test feature and the stable test feature are measured.

23. The method of claim 22 wherein the first number is greater than the second number.

24. The method of claim 22 wherein:
the first number of workpieces in the series are measured according to a reduced test plan;
the reduced test plan encompasses the unstable test feature and excludes the stable test feature;
the second number of workpieces in the series are measured according to a complete test plan; and
the complete test plan encompasses the unstable test feature and the stable test feature.

25. The method of claim 24, wherein:
the reduced test plan includes movement commands for a measurement sensor; and
the movement commands define a reduced movement path that results in a measurement time that is less than a measurement time of the complete test plan.

26. The method of claim 10 wherein the determining of (a) and the determining of (b) include evaluating a data set including data from an earlier measurement of at least one workpiece having the plurality of test features.

* * * * *